United States Patent [19]

Haggard

[11] E Patent Number: Re. 32,085

[45] Reissued Date of Patent: Feb. 25, 1986

[54] TUBULAR MEMBER INTERIOR WIPER

[75] Inventor: Archie K. Haggard, Houston, Tex.

[73] Assignee: Haggard I. D. Wiper, Inc., Houston, Tex.

[21] Appl. No.: 529,061

[22] Filed: Sep. 2, 1983

Related U.S. Patent Documents

Reissue of:

[64] Patent No.: 4,287,948
Issued: Sep. 8, 1981
Appl. No.: 74,843
Filed: Sep. 13, 1979

U.S. Applications:

[63] Continuation-in-part of Ser. No. 25,302, Mar. 30, 1979, abandoned.

[51] Int. Cl.[4] ..... E21B 37/02

[52] U.S. Cl. ..... 166/170; 166/202

[58] Field of Search ..... 166/170, 173, 176, 177, 166/154–156, 202, 195; 417/555 R, 555 A; 92/240; 15/104.5, 104.16

[56] References Cited

U.S. PATENT DOCUMENTS

| | | | |
|---|---|---|---|
| 1,732,277 | 10/1929 | Owens | 15/104.16 |
| 2,257,080 | 9/1941 | Turner | 166/170 X |
| 2,460,481 | 2/1949 | Abel | 15/104.05 X |
| 2,728,398 | 12/1955 | Taylor | 166/170 |
| 2,740,480 | 4/1956 | Cox | 166/170 |
| 4,034,807 | 7/1977 | Prince et al. | 166/170 |
| 4,221,264 | 9/1980 | Haggard | 166/177 |

*Primary Examiner*—James A. Leppink
*Assistant Examiner*—Hoang C. Dang
*Attorney, Agent, or Firm*—Fulbright & Jaworski

[57] ABSTRACT

A wiper for wiping liquids from the interior walls of various tubular members, such as drill pipe, tubing, casing or internal upset pipe is disclosed which is particularly useful in drilling and workover as the tubular members are withdrawn from a well bore. Features of the wiper include the ability to readily and easily pass through and wipe liquids from restricted passages or bores such as internal upset pipe, means for centralizing the wiper in the passages or bore for efficient wiping, pressure equalization for equalizing pressures within the wiper with outside pressures encountered within the well bore, made from materials which will not create an explosive condition in use, and ease of manufacture, assembly and disassembly, so that the wiper can be manufactured easily, readily and inexpensively, and repairs and replacement of wear prone parts can be readily and inexpensively made. Other features and advantages are disclosed.

10 Claims, 8 Drawing Figures

Fig. 1
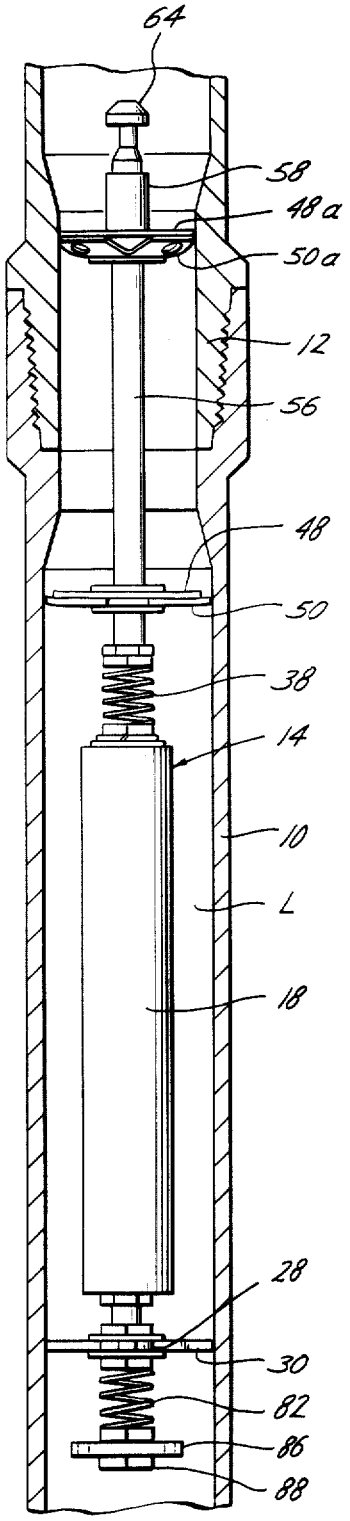
Fig. 4
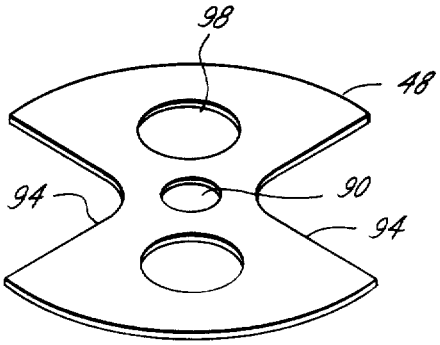
Fig. 5
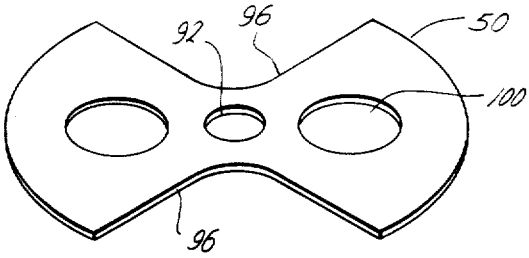
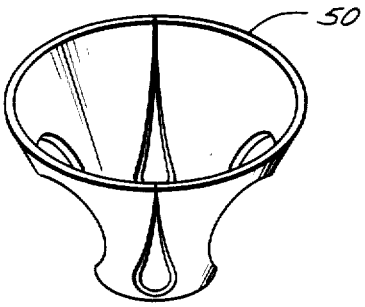
Fig. 5A

TUBULAR MEMBER INTERIOR WIPER

Matter enclosed in heavy brackets [ ] appears in the original patent but forms no part of this reissue specification; matter printed in italics indicates the additions made by reissue.

CROSS-REFERENCE TO RELATED APPLICATION

The present application is a Continuation-In-Part application of U.S. application Ser. No. 25,302, filed Mar. 30, 1979, abandoned in favor of this application.

BACKGROUND OF THE INVENTION

There has been a need for a wiper which wipes the internal walls of tubular members free of liquids, such as drill pipe, tubing, casing, and particularly tubular members having restricted passages, such as internal upset pipe and tubing, in operations such as drilling and workover, so that liquids, such as drilling muds, oil and the like are not spilled on the floor when coming out of the bore to change drill bits or other operations requiring removal of drill pipe, tubing and the like. Spilling of such liquids on the floor is hazardous and drilling muds are quite expensive. A number of proposals have been made in the past to wipe the inside of these tubular members free of liquid; however, these have not been entirely satisfactory.

Patents which relate to various wipers for use inside of pipes or tubes include the following U.S. Pat. Nos.: 1,510,581 to Boynton; 1,732,277 to Owens; 2,257,080 to Turner; 2,460,481 to Abel; 2,740,480 to Cox; 3,058,525 to Humphries; 3,265,133 to Burch; and 4,007,784 to Watson, et al. Of these patents the patent to Cox discloses a pipe wiper having a plurality of bunched flexible discs above a float for wiping the inside of drill pipes as the pipes are being removed from the well.

The patent to Humphries has a plurality of arms extending out and contacting the inner wall of the pipe for holding the Humphries cleaning apparatus in a centralized position.

The remaining patents are illustrative of the state of the art.

The foregoing patent structures and proposals have a number of disadvantages. They cannot readily pass through and clean the interior of restricted openings, such as internal upset tubing or drill pipe, they are not pressure equalized so that when pressures are encountered in the well bore damage to or malfunctioning of the wiper occurs, they are relatively expensive to manufacture and are not readily repairable, they do not include a grappling or fishing head by which the wiper can be removed readily from the tubular member, such as by a wire line and an overshot, and they are not made of materials which avoid explosive conditions in use.

It would be highly advantageous to provide a wiper for wiping liquids from the interior of tubular members as they are removed from a bore hole which overcomes the disadvantages and shortcomings of prior art wipers, such as set forth above.

In U.S. application, Ser. No. 848,966, a related application of Ward M. Haggard, a wiper is disclosed which overcomes some of the foregoing disadvantages.

SUMMARY

The present invention is directed to an improved wiper for wiping liquids from the interior of various tubular members which overcomes the foregoing disadvantages and shortcomings of prior art wipers and constitutes an improvement on the wiper disclosed in the above-identified application.

In short, the wiper includes an elongate mandrel provided with a buoyant chamber at its bottom portion effective to float the mandrel, has a flexible centralizer connected to its bottom portion adjacent the buoyant chamber arranged to permit movement of liquid past it and centralize the lower portion of the wiper in the bore, and includes first and second flexible wipers comprised of flexible members provided with drain openings through them and which extend outwardly far enough to engage and circumferentially wipe the largest bore and flexible enough to readily retract to pass through and wipe the smallest bore of the tubular member, which wipers are secured to the wiper above the float and are axially spaced from one another a distance sufficient so that they do not bunch up and readily pass through the smallest bore of the tubular member, such as internal upset drill pipe or tubing, and which also centralize the wiper's upper portion in the bore of the tubular member. The parts of the wiper which engage interior walls of the members to be wiped are made of inert materials, such as aluminum alloy and rubber so as not to cause an explosive condition in use. Sections of the wiper are yieldingly connected together for easy and nonsticking movements through the bore to be wiped. The wiper floats in the liquid in the bore with the wipers above the liquid, and as the tubular member is removed from the well bore, the wipers wipe the bore of the tubular member of liquid and any of the liquid above the wiper drains through the drain holes thereby preventing an accumulation of liquid on the floor of the drilling rig or workover rig.

The wiper includes improved pressure equalizing means which equalizes pressure inside the buoyant chamber with pressure in the tubular member to prevent damage to or malfunctioning of the wiper, and includes a fishing head which is arranged to be engaged with a grapple on a wire line for ready removal of the wiper from the bore when desired.

Preferably, the wipers are removably secured to the mandrel by means of spacers and an extension member and a removable retaining head, and the centralizer comprises a plurality of flexible arms and is removably connected to the wiper so that these wear prone parts can be readily removed and replaced.

It is therefore an object of the present invention to provide a wiper for wiping liquids from the interior of tubular members as they are removed from a bore hole which readily and easily wipes the liquids from the bores of tubular members including those having restricted passages, such as internal upset tubing and drill pipe, and which is centralized in the bore to effectively wipe the internal walls of the bore clean of liquids.

A further object of the present invention is the provision of a wiper for wiping liquids from the internal walls of tubular members as it is removed from a bore hole in which the wiper is pressure equalized with unexpected pressures encountered in the bore.

A further object of the present invention is the provision of a wiper for wiping liquids from the internal walls of tubular members as they are withdrawn from a bore hole in which parts of the wiper can yieldingly move with respect to other of its parts thereby permitting easy movement of the wiper through restricted or canted openings in the tubular members.

A further object of the present invention is the provision of a wiper for wiping liquids from the internal walls of tubular members as they are removed from a bore hole in which the wiper is constructed of inert materials which could engage the internal walls of steel tubular members at high rates of speed thus avoiding combusting and exploding explosive gases, such as methane, present in the mud in the bore hole.

A further object of the present invention is the provision of a wiper for wiping liquids from the internal walls of tubular members as they are removed from a bore hole which is inexpensive to manufacture, easy to assemble and disassemble, and in which wear prone parts, the wipers and centralizers, can be readily removed and replaced.

A further object of the present invention is the provision of a wiper for wiping liquids from the internal walls of tubular members as it is removed from a bore hole and which includes a fishing head which can be engaged and retrieved by a grapple on a wire line for ready removal from the tubular member when desired.

Other and further features, objects and advantages of the invention appear throughout.

BRIEF DESCRIPTION OF THE DRAWINGS

FIG. 1 is a side elevation of internal upset drill pipe or tubing shown in section and illustrating a wiper in elevation therein according to the invention.

FIG. 4 is a perspective view of a wiper member of the wiper.

FIG. 5 is a perspective view of another wiper member of the wiper.

FIG. 5A is a perspective view of the wiper member of FIG. 4 in retracted position.

DESCRIPTION OF THE PREFERRED EMBODIMENTS

Figures 2, 3:
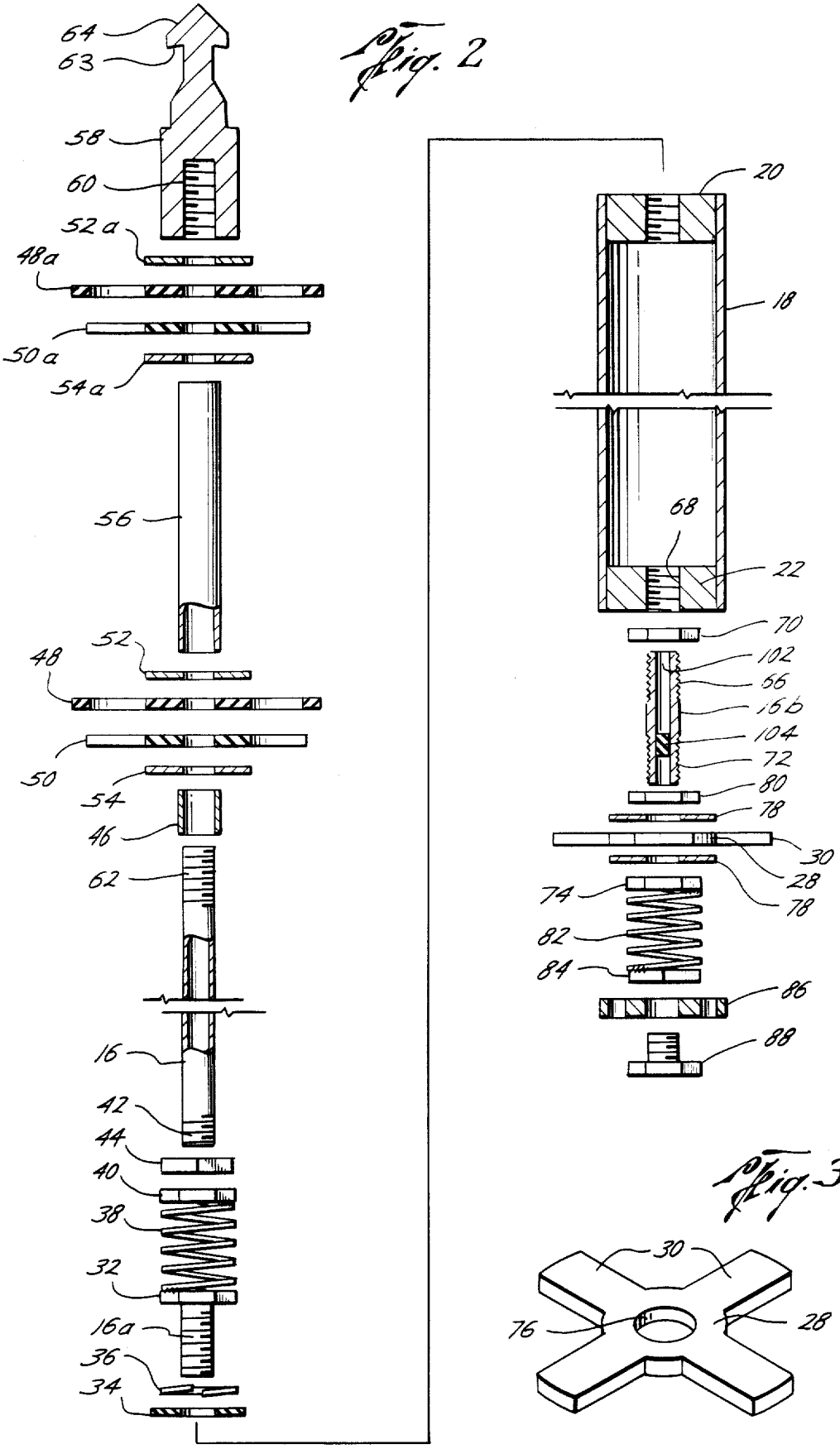
FIG. 2 is an exploded elevational view, partly in section, illustrating the wiper of FIG. 1.
FIG. 3 is a perspective view of a stabilizer of the wiper of FIG. 1.

Referring now to the drawings, and particularly to FIG. 1, a tubular member 10 having the internal upset portion 12 for securing sections of the tubular member together is illustrated, which is here shown as internal upset tubing or drill pipe used in the drilling or working over of wells in a well bore or casing, not shown. While internal upset drill pipe or tubing is illustrated, the wiper of the present invention can be used for cleaning liquids from the internal walls of any member, such as drill pipe, tubing, casing and various tools and apparatus having bores or passages through them. As illustrated in FIG. 1, the wiper 14 is illustrated floating in the liquid L, such as drilling mud, well liquid and the like.

In this connection, it is common practice in the drilling of bore holes for oil, gas and the like, to use various kinds and specific gravities of drilling mud which is circulated in the bore hole during drilling operations. As previously mentioned, these muds are expensive and include chemicals, wetting materials and the like and it is highly desirable to wipe the interior walls of the tubular member clean as it is withdrawn from the bore hole or casing when coming out of the hole in drilling or workover operations. In this connection, the term "bore hole" as used herein means both cased and uncased bore holes, that is, the tubular member may be in casing in a bore hole or may be simply in an uncased bore hole.

Referring now to FIG. 2, which illustrates the assembly of the wiper 10 and its components, the wiper includes elongate, tubular mandrels 16 and 16a to which an elongate tubular buoyant chamber 18 is secured to the lower and a mandrel 16b is secured to the lower end of the buoyant chamber 18. Various components of the wiper are secured to these mandrels as subsequently described. The bouyant chamber 18 is effective to float the wiper 14 in liquids L in the bore of the tubular member 10 in which the wiper is to be used and the buoyant chamber 18 is closed at its top and bottom by the closure members 20 and 22, respectively. The mandrel 16 extends upwardly above the top 20 of the buoyant chamber 18 a substantial distance and the lower mandrel 16b extends below the bottom 22 of the buoyant chamber 18 a relatively short distance, as illustrated.

A flexible centralizer 28, here shown as having the radially outwardly extending flexible arms 30 (see FIG. 3) is removably secured to the mandrel 16a below the buoyant chamber 18. The arms 30 extend outwardly radially a distance sufficient to centralize the lower end of the wiper 10 in the bore of the tubular member 10.

As shown in FIG. 2, the lower end of the mandrel 16a is threaded and is threaded into the upper closure end 20 of the buoyant chamber 18. For this purpose the nut or enlargement 32, a packing member 34 and a friction ring 36 are provided so that when the nut 32 is completely threaded into the threaded opening in the upper closure member 20, the packing is compressed against the upper surface thereof and the lower surface of the nut 32 thereby effectively closing the upper closure member 20, and hence, the upper portion of the float chamber 18.

Secured to the nut 32 is a coil spring 38 which in turn is secured to another nut 40 which threadedly receives the lower threaded end 42 of the mandrel 16. An internally threaded locking 44 is also provided so that the lower end 42 of the mandrel 16 is readily and releasably secured to the nut 40 and, hence, by the spring 38 and threaded mandrel 16a to the upper end 20 of the float chamber 18. A first tubular spacing member 46 is slidably disposed about the mandrel 16 and spaces the first wiper assembly, here shown as the wiper members 48 and 50 slightly above the spring 38. A pair of support rings or washers 52 and 54 are provided at the top and bottom of the wiper [numbers] *members* 48 and 50, all of which is slipped over the mandrel 16 and moved along the mandrel 16 until such time as the spacer 46 engages the lock ring 44.

A second tubular spacing member 56 is provided which also is slidable about the mandrel 16 and a second wiper assembly, here shown as the wiper members 48a and 50a and the stop rings or washers 52a and 54a, is slidable on the mandrel 16. The wiper members 48a and 50a as well as the support rings or washers 52a and 54a advantageously can be and are the same as those of the first wiper assembly. The spacer 56 is of sufficient length to space the first and second wiper assemblies axially a distance from one another to permit ready passage through the smallest bore of the tubular member 10, for example, the internal upset portion 12, illustrated in FIG. 1.

Referring again to FIG. 2, a retainer head 58 is provided which is internally threaded at its lower end, as indicated by the reference numeral 60, into which the upper threaded end 62 of the mandrel 16 is threaded which thus securely maintains the spaced first and second wipers or wiper assemblies in the desired position. Advantageously the retainer 58 has a fishing head at its upper end, here shown as the downwardly facing annular shoulder 63 and the upwardly tapered upper surface 64 so that it can readily be grappled by a fishing tool or grapple on a wire line, not shown, for removal from the bore hole from the tubular member 10, when desired. Since fishing tools and wire lines are well known and are commonly used in drilling, no detailed discussion or description thereof is deemed necessary or given.

The stabilizer 28 is connected below the buoyant chamber 18 and to its lower closure member 22 by means of the lower mandrel 16b which is threaded at its upper end 66 and is threaded into the threaded opening 68 in the lower closure member 22. An internally threaded locking ring or nut 70 is provided so that the lower mandrel 16b can be readily and releasably secured to the lower end of the buoyant chamber 18.

The lower end 72 of the lower mandrel 16b is also threaded so that it can be threaded into the internal threads, not shown, of the nut 74. The stabilizer 28 is provided with the opening 76, the retainer rings or washers 78 are disposed on both sides of the centralizer 28 and a threaded nut 80 is provided so that the centralizer is securely but releasably secured to the lower mandrel 16a.

A coil spring 82 is secured to the threaded nut 74 at its upper end and to a lower threaded nut 84 at its lower end to which a guide member 86 is secured by means of the threaded nut 88.

Thus, all of the components of the wiper 14 can be assembled and secured together readily and easily yet they can be readily removed from the wiper 10 for replacement, repair and the like.

The components of the wiper assembly which could contact the inner walls of the tubular members, normally made of steel, are made of an inert material, such as aluminum alloy and rubber, to avoid creating an explosive condition when operating at high rates of speed. Frequently, methane gas is present in the mud system and when combined with oxygen an explosive condition is present. Thus, the wiper is "explosion proof."

The wiper members 48, 50, 48a and 50a are best illustrated in FIGS. 4, 5 and 5a to which reference is now made. Each of these members, of course, has an opening 90 and 92, respectively, of a size so that they will slide over the mandrel 16. The wiper members 48, 50, 48a and 50a are generally disc-like members which have substantially cut out portions 94 and 96 on opposite sides to permit a substantial flexing, for example, as illustrated in FIG. 5a, when passing through very restricted openings in tubular member 10. Each of the wiper members 48, 50, 48a and 50a have the openings 98 and 100 to permit passage or drainage of liquid in the tubular member 10 through the wiper assemblies.

Preferably, the wiper members 48 and 50 and 48a and 50a are disposed together in the positions as illustrated in FIGS. 4 and 5, that is 90° from one another to insure complete circumferencial wiping of the interior walls of the tubular member 10, and yet, the wiper members 48 and 50 are such so that they will readily contract and pass through the smallest openings in various tubular members which it is desired to be wiped clean so that the wiper 14 will remain in the liquid held in the tubular member 10 rather than becoming stuck therein and being pulled up out of the hole inside the tubular member.

The flexible wipers are formed of a flexible material and may be made of any suitable inert material, such as rubber, and when assembled have a circumferential outer surface which extends outwardly far enough to engage and wipe the walls of the largest bore of the tubular member 10 in which it is used, yet they are flexible enough to readily retract to pass through and wipe the smallest bore thereof. The wipers may be single discs or take other forms and any number of drain openings can be provided. The form of wipers illustrated, however, have been effective in use. In this connection, it is essential that the wipers be spaced axially a distance from one another to permit ready passage through the smallest bore, for example, the internal upset portion 12, of the tubular member 10. To provide a plurality of flexible wipers closely spaced to one another so that they bunch up would prevent the wiper from moving through the smallest or restricted bore, such as the internal upset portion 12 of the tubular member 10, when raising the tubular member out of the well bore thus bringing the wiper with it and thus not wiping the sections of the tubular member therebelow and thus not functioning as intended. Preferably, the flexible wipers are spaced a distance slightly greater than the distance of the internal upset portion so that only one of them is in the internal upset portion at a time. They may be spaced a slightly less distance, it only being necessary that the flexible members not be so close together that in their retracted position they will cause the wiper to remain in the restricted portion as the tubular member is withdrawn from the well. Also, while two flexible wiper assemblies are illustrated, any number can be used, it only being necessary that the wipers flex sufficiently and are spaced apart enough axially so that they readily pass through restricted openings by gravity, that is, by the weight of the floating wiper. These distances are readily determined in manufacturing the wiper 10 for various end uses.

Similarly, the arms 30 of the stabilizer 28 should be made of an inert flexible material, such as rubber, so that the arms can retract readily and easily and not become stuck in the bore of the tubular member 10, yet avoid an explosive condition.

Means are provided for equalizing the pressure within the buoyant chamber 18 with the pressure in the well bore when encountering pressure to prevent damage to the buoyant chamber 18 or to collapse it, thus permitting the wiper to sink in the liquid L and not function as intended. In the embodiment illustrated in FIGS. 1 and 2, and as best shown in FIG. 2, a passage 102 is provided through the lower mandrel 16b which provides a passage into the interior of the bouyant chamber or float 18. In this embodiment, the passage 102 is normally closed by the resilient plug 104, which may be omitted as subsequently set forth, which is forced upwardly into the buoyant chamber 18 under any desired difference of pressure between the exterior and the interior of the buoyant chamber 18 so that when pressure is unexpectedly encountered in use, the plug 104 will flow into the buoyant chamber 18 thus permitting flow of pressure in the passage 102 in the mandrel 16b into the interior of the buoyant chamber 18, thereby equalizing the pressure within the buoyant chamber 18 with the pressure in the tubular member or in the well bore. Any desired pressure equalizing means can be used to equalize the pressure within the buoyant chamber with that outside of it to prevent collapsing of the buoyant chamber or float 18, as desired.

In using the wiper, and with reference to FIG. 1, the wiper floats in the liquid L, being buoyed into a floating position by the buoyant chamber 18 with the wipers 48 and 50 and 48a and 50a above the liquid L. As the tubular member 10 is withdrawn from the well the wiper 14 floats in the liquid L, gravity retaining it therein, and the flexible wiper members 48, 50, 48a and 50a wipe the inner walls or bore of the tubular member 10 of liquid, such as drilling mud, oil and the like, so that when the tubular members are withdrawn to the derrick floor and disconnected these liquids to not spill on the floor. In the event pressures are encountered in the tubular member which would damage or cause malfunctioning of the wiper 14 if not equalized, the plug 104 is forced by the pressure into the buoyant chamber 18 thus equalizing pressure within the buoyant chamber 18 with the outside pressure and thus preventing damage to or malfunctioning of the wiper 14. The springs 38 and 82 permit canting or angular movement of parts of the wiper 14 with respect to one another to prevent the wiper 14 from becoming stuck in a portion of the tubular member 10. If for any reason it is desired to remove the wiper 14 from the interior of the tubular member 10, a grapple on a wire line, not illustrated, can be lowered inside the passage or bore of the tubular member 10, the fishing head 62 grappled, and the wiper 14 readily removed, or the wiper 14 can be pumped out by reversing pumping of the mud.

In the event of mechanical difficulties with the drill string 10 or tools attached to the drill string 10, a small applied weight, such as 2 or more pounds will force the wiper 14 to the bottom of the drill string 10 so as not to interfere with remedial action. On release of the applied weight, the wiper will rise and float as before.

In the event it is desired to replace wear prone parts, such as the wiper members 48, 50, 48a and 50a, the fishing/retainer head 58 is removed, the worn or damaged wiper members, washers, and spacer, slid off and replacements reassembled on the upper portion 24 of the mandrel 16 and the fishing/retainer head 58 replaced, as previously described. Also, the centralizer 28 can be removed and replaced simply by unthreading the nut 88, removing the centralizer 28 and replacing it, and rethreading the nut 88 into place, as described previously.

As previously mentioned, the distance between the flexible wipers is a function of the pipe size and the tool joint or apparatus in which it is to be used. For example, for many uses, a 20 inch spacing between the wipers is satisfactory. The dimensions of the buoyant chamber 18 are a function of the dimensions or internal diameter of the pipe, tool joint or apparatus in which the wiper 14 is to be used and to compensate for the weight involved and to float the wiper 14. These are all determined in advance readily and easily for a particular end use, that is, pipe or tool joint or apparatus size.

Figure 6:
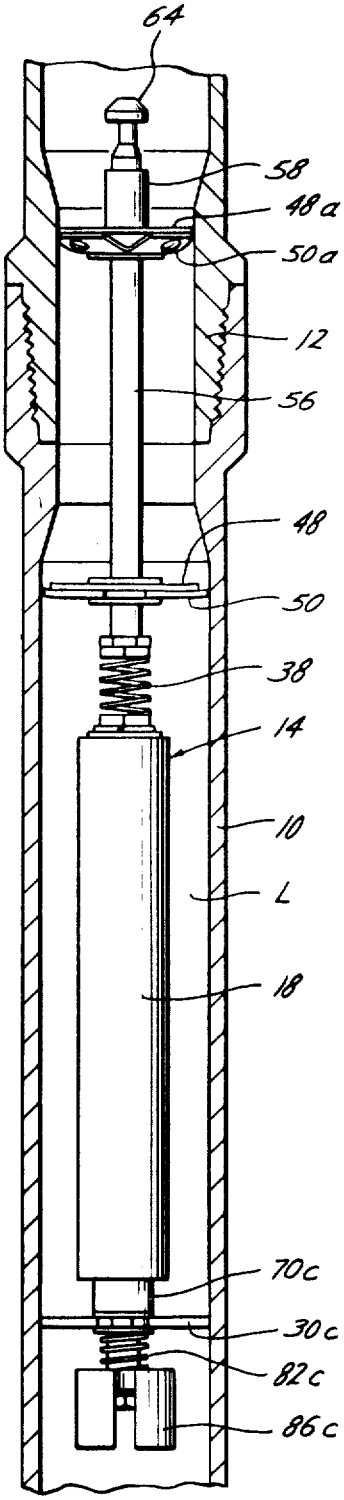
FIG. 6 is a view similar to that of FIG. 1 illustrating a modification.
Figure 7:
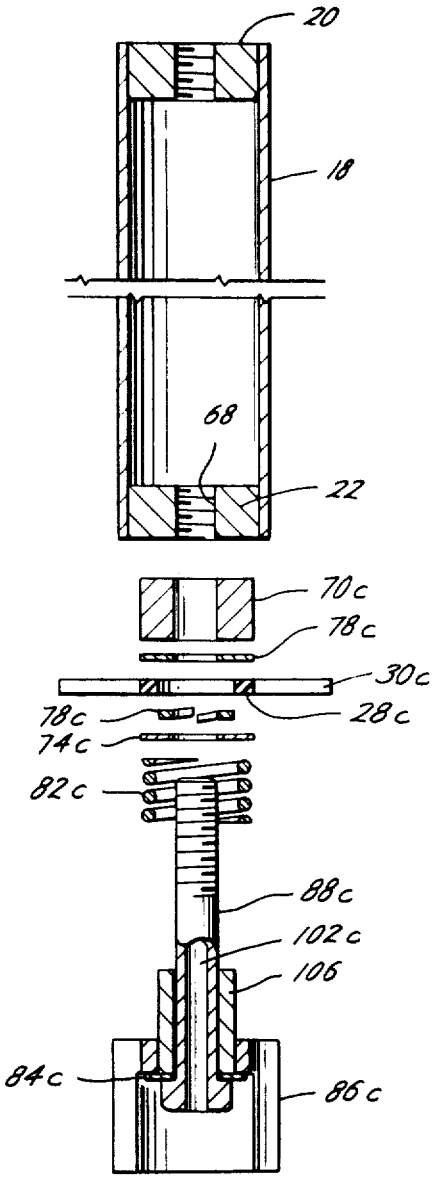
FIG. 7 is an exploded view similar to that of FIG. 2 of the modification of FIG. 6.

A modification of the wiper is illustrated in FIGS. 6 and 7, to which reference is now made, and in which the reference letter "c" is added to numerals designating corresponding parts in the previous Figures. In short, the modification provides an open passage 102c from outside the lower portion of the wiper to the interior of the buoyant chamber 18. Thus, pressure is equalized at all times from inside the buoyant chamber 18 to outside of it, the air pocket being trapped therein being sufficient to float the wiper as previously described.

As best illustrated in FIG. 7, to which reference is now made, an elongate or mandrel-like bolt 88c is provided, which has the passage 102c, and which threads into the threaded opening 68 at the lower end 22 of the buoyant chamber 18.

A spacing and weight like member 70c is provided immediately below the bottom 22 of the buoyant chamber 18, and below it is provided the washer 78c, the flexible centralizer 28c with its flexible arms 30c, a lock ring 78c, the washer 74c, the coil spring 82c, the tubular spacer member 106 which bears against the lower portion of the coil spring 82c and surrounds the elongate bolt 88c, the washer 84c, and the guide member 86c. Thus, as in the upper portion of the wiper, the lower portion can be assembled and secured together readily and easily simply by threading the bolt 88c into the threaded opening 68 in the bottom 22 of the buoyant chamber 18; and can be disassembled by unthreading the bolt 88c.

As previously mentioned, the buoyant chamber 18 is at all time in pressure equalization with its surroundings by virture of the passage 102c. Also, air is entrapped within the buoyant chamber 18 which provides sufficient buoyancy for the wiper to float in the drilling [mut] *mud*, all as previously described.

All other parts and its mode of operation are the same as that described in connection with FIGS. 1–5.

As previously mentioned, the wipers can take a variety of forms and shapes, and the mandrels and spacers need not be tubular. Also, the wiper can be used to wipe other than tubular bores.

The present invention therefore is well suited and adapted to attain the objects and ends and has the advantages and features mentioned as well as other inherent therein.

While presently preferred embodiments have been given for the purposes of disclosure, changes may be made therein which are within the spirit of the invention as defined by the scope of the appended claims.

What is claimed is:

1. A wiper for wiping liquids from the interior walls of a bore of a member as it is removed from a bore hole comprising, a buoyant chamber having a closed top and a bottom effective to float the wiper in liquids in the bore of the member and being smaller in external diameter than the smallest bore of the member in which the wiper is to be used,

[a flexible centralizer connected to the wiper adjacent the bottom of the buoyant chamber arranged to permit movement of liquid past it, the centralizer extending outwardly sufficiently to centralize the bottom portion of the wiper in the bore of the member and flexible enough to readily pass through the smallest bore of the member,]

a mandrel yieldingly connected to and extending upwardly from the buoyant chamber, first and second flexible wipers provided with drain openings through them, the wipers extending outwardly far enough to engage and arranged to circumferentially wipe the largest bore and flexible enough to readily retract to pass through and circumferentially wipe the smallest bore of the member, means securing the first and second wipers to the mandrel, the first and second wipers being axially spaced from one another a distance sufficient to permit ready passage through the smallest bore of the member and to centralize the wiper's upper portion in the bore of the member, whereby the wiper floats in the liquid in the bore with the first and second wipers above the liquid, and as the member is removed from the well bore, the first and second wipers wipe the bore of the member of liquid and any of the liquid above the wipers drains through the drainholes, and means for equalizing pressure within the buoyant chamber with pressure in the well bore comprising an open passageway extending into a lower portion of the buoyant chamber, the bouyant chamber, [the flexible centralizer,] the mandrel and the first and second wipers formed of material which will not cause an explosion of an explosive mixture when rubbing or striking the interior walls of the member.

2. The wiper of claim 1 where, the means for equalizing pressure within the buoyant chamber with pressure in the member, comprises a second mandrel connected to the lower portion of the buoyant chamber and having the passageway extending into the buoyant chamber.

3. The wiper of claim 2 including, a pressure plug in the passageway operable to move out of the passage in response to a predetermined maximum pressure differential between the pressures inside and outside of the buoyant chamber thereby equalizing pressure in the buoyant chamber with pressure in the member when the wiper is subjected to pressure therein greater than the maximum pressure differential.

4. The wiper of claim 1 including, a fishing head connected to the upper end of the mandrel having a downwardly facing shoulder extending outwardly of the mandrel for engagement with a grapple for removal of the wiper from the bore of the member, the fishing head formed of a material which will not cause an explosion with an explosive mixture when striking the interior walls of the member.

5. The wiper of claim 1 where, at least one of the first and second wipers comprises, a pair of flexible discs having inwardly tapering opposed sides, the discs being arranged with respect to one another to provide complete circumferencial wiping in all positions, the discs formed of a material which will not cause an explosion with an explosive mixture when striking the interior walls of the member.

6. A wiper for wiping liquids from the interior of the bore of a member as it is removed from a bore hole comprising, an elongate, tubular buoyant chamber having a bottom and a closed top, the chamber effective to float the wiper in liquids in the bore of the member and being smaller in external diameter than the smallest bore of the member in which the wiper is to be used, a mandrel yieldingly connected to and extending upwardly from the buoyant chamber, first and second flexible wipers comprised of one or more flexible wiper members forming a circumferential wiping surface and provided with drain openings through them, the wipers extending outwardly far enough to engage or wipe the largest bore and flexible enough to readily [retarct] *retract* and pass through and wipe the smallest bore of the member, a [first] spacer slidably disposed about the mandrel, the [second] *first* wiper being slidably disposed about the mandrel below the spacer and the second wiper being slidably disposed about the mandrel above the spacer, the [first] spacer axially spacing the first and second wipers from one another a distance sufficient to permit ready passage through the smallest bore of the member, and to centralize the wiper's upper portion in the bore of the member,

[a second mandrel secured to and extending from the bottom of the buoyant chamber, and a flexible centralizer connected to the second mandrel, the flexible centralizer arranged to permit movement of liquid past it and extending outwardly sufficiently to centralize the bottom of the wiper in the bore of the tubular member and flexible enough to readily pass through the smallest bore of the member,]

whereby the wiper floats in the liquid in the bore with the wipers above the liquid, and as the member is removed from the well bore, the wiper continues to float in the liquid and the first and second wipers wipe the bore of the member of liquid and any of the liquid above the wipers drains through the drain openings, and means for equalizing pressure within and outside the buoyant chamber comprising a passageway extending [in the second mandrel] into [the bottom of] the buoyant chamber, the buoyant chamber, [the flexible centralizer,] the [first] mandrel, and the first and second wipers, formed of material which will not cause an explosion of an explosive mixture when rubbing or striking the interior of the member.

7. The wiper of claim 6 where, the first and second wipers are comprised of at least a pair of wiper members, each wiper member of which being a flexible disc having opposed sides substantially cut out, each wiper member being arranged with respect to the other wiper member of its pair so that a complete circumferencial wiping surface is provided by each pair of wipers.

8. The wiper of claim 6 including, a guide member yieldingly connected to the [second mandrel's lower end below the centralizer,] *buoyant chamber's lower end,* the guide member formed of a material which will not cause an explosion of an explosive mixture when rubbing or striking the interior of the member.

*9. The wiper of claim 1 including,*

*a guide member yieldingly connected to the buoyant chamber's lower end.*

*10. The wiper of claim 6 including,*

*a guide member yieldingly connected to the buoyant chamber's lower end.*

* * * * *